UNITED STATES PATENT OFFICE.

BRUNO RICHARD SEIFERT, OF RADEBEUL, NEAR DRESDEN, GERMANY, ASSIGNOR TO DR. F. VON HEYDEN NACHFOLGER, OF SAME PLACE.

PROCESS OF MAKING OXYMETHOXYBENZOIC ACIDS.

SPECIFICATION forming part of Letters Patent No. 470,920, dated March 15, 1892.

Application filed April 19, 1889. Serial No. 307,852. (Specimens.)

*To all whom it may concern:*

Be it known that I, BRUNO RICHARD SEIFERT, of Radebeul, near Dresden, in the Kingdom of Saxony, German Empire, have invented a new and useful Improvement in Oxymethoxybenzoic Acids, of which the following is a specification.

It is known that carbon acids are obtained from phenol and its homologues by heating their alkaline salts with carbonic acid. I have discovered that in like manner it is possible to obtain from guaiacol and eugenol the following methylized dioxybenzoic acids, namely:

$$\text{Guaiacol carbon acid} \quad C_6H_3 \begin{cases} COOH & 1. \\ OH & 2. \\ OCH_3 & 3. \end{cases}$$

$$\text{Eugetinic acid} \quad C_6H_2 \begin{cases} COOH & 1. \\ OH & 2. \\ OCH_3 & 3. \\ O_3H_5 & 5. \end{cases}$$

Guaiacol carbon acid is a new hitherto unknown substance. Eugetinic acid has, however, been produced by Scheuch; but in such a manner or method which by reason of its high cost and inferior working could not be employed for industrial or commercial purposes. Scheuch (*Liebig's Annalen*, volume 125, page 17) adds metallic sodium to the hot eugenol and simultaneously conducts a current of carbonic acid through the liquid. Scheuch obtained a semi-fluid product consisting of eugenol and eugetinate of sodium. In this reaction a very small part of the eugenol employed is introduced or converted into eugetinic acid. The greater part of the eugenol remains intact.

By my new process, which I will now proceed to describe, I convert the entire mass of the eugenol employed into eugetinic acid. I take for every one molecule of eugenol one molecule of caustic soda. I dissolve the caustic soda in water and in this solution I dissolve the eugenol. I then heat the compound solution to a sufficient temperature and for a sufficient time to drive off all the water of the aqueous caustic soda and that resulting from the combination of the eugenol and the alkali, leaving a dry salt. I next saturate this dry salt with carbonic acid under pressure in a closed vessel at a temperature of over 100° centigrade, or even without any heating at all. In the latter case the cold saturated product is to be heated afterward in a closed vessel to over 100° centigrade. The caustic soda may in this process be replaced by another alkali or earthy alkali. The product of the reaction is dissolved in water and mixed with a mineral acid, whereupon the eugetinic acid precipitates.

By the same process I have manufactured a new acid from guaiacol. I have named it "guaiacol carbon acid." This product crystallizes with two molecules of water and melts if dehydrated at from about 148° to 150° centigrade. It gives, when in aqueous solution, a blue color with chloride of iron, and is decomposed by heat into carbonic acid and guaiacol. These acids serve for the manufacture of azo coloring-matters and also as a medicine for rheumatism.

What I claim as my invention, and desire to secure by Letters Patent, is—

The process of making guaiacol acid and eugetinic acid, consisting in first making an aqueous solution of guaiacol or eugenol and an alkali or earthy alkali, next evaporating all the water of said solution to obtain a dry salt, and finally saturating the said dry salt with carbon dioxide under pressure and heating at a temperature of over 100° centigrade, substantially as herein set forth.

In testimony that I claim the foregoing as my invention I have signed my name in presence of two subscribing witnesses.

BRUNO RICHARD SEIFERT.

Witnesses:
WILHELM WIESENHÜTTER,
RICHARD KUNZE.